Patented June 19, 1945

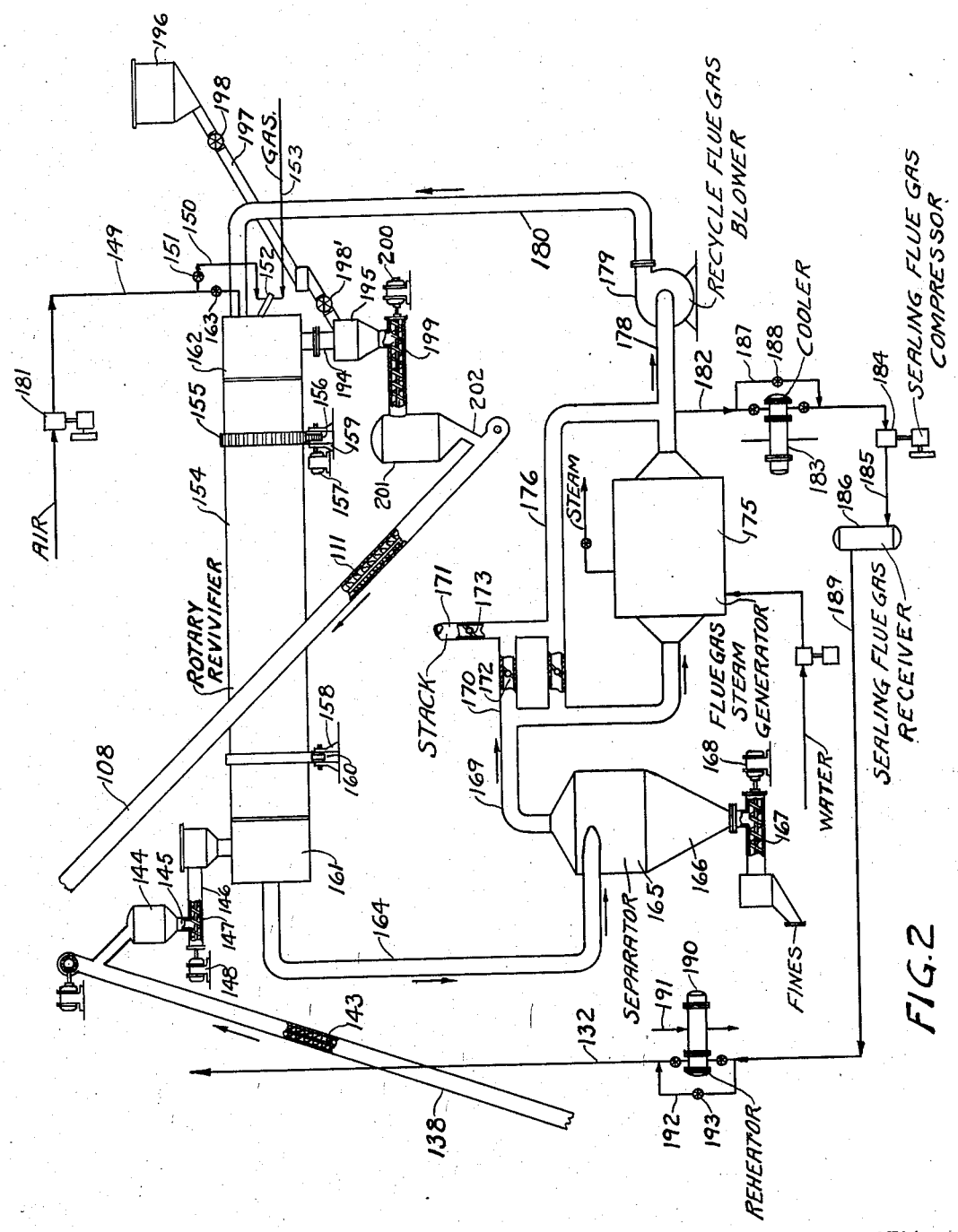

2,378,394

UNITED STATES PATENT OFFICE 2,378,394

APPARATUS FOR CONVERTING HYDROCARBON OILS

William J. Degnen, Westfield, N. J., Henry M. Nelly, Jr., Houston, Tex., and Percival C. Keith, Jr., Peapack, N. J., assignors to The M. W. Kellogg Company, Jersey City, N. J., a corporation of Delaware Application May 31, 1940, Serial No. 338,196

3 Claims. (Cl. 196—2)

The present application is a continuation-in-part of our co-pending application Serial No. 199,702 filed April 2, 1938, now U. S. Patent 2,350,730.

Our invention relates to an apparatus for converting hydrocarbon oils and more particularly to a method for converting high boiling hydrocarbons into low boiling hydrocarbons, and apparatus capable of being used for converting high boiling hydrocarbons into low boiling hydrocarbons or low boiling hydrocarbons into high boiling hydrocarbons in the presence of a catalyst.

The catalytic cracking or polymerization of hydrocarbon oils is known to the art. In general, the methods of the prior art consist in heating hydrocarbon oil to cracking temperatures and passing highly heated oil or its vapors through a cracking zone in the presence of a suitable catalyst in order to convert the hydrocarbon oil into the desired products. For various reasons, the catalyst passes through various stages of effectiveness with use, eventually requiring regeneration. Thus, during an operation, the catalyst varies in effectiveness so that, for any given catalyst bed, only average effectiveness is obtained.

One object of our invention is to provide an apparatus for cracking or polymerization in the presence of a catalyst wherein the catalytic bed is continuously being removed and revivified so that the catalytic bed will remain of substantially constant effectiveness.

Another object of our invention is to provide apparatus capable of carrying out a method of catalytic cracking or catalytic polymerization in which the catalyst is continuously removed and revivified.

Another object of our invention is to provide a catalyst chamber in which the catalyst is continuously replaced.

Another object of our invention is to provide a catalyst chamber in which heat is supplied to the oil vapors passing therethrough to control the temperature drop through the chamber.

A further object is the provision of means for sealing the catalyst chamber during the progressive movement of catalyst therethrough. Other and further objects of our invention will appear from the following description.

In the accompanying drawings which form part of the instant specification and are to be read in conjunction therewith and in which like reference numerals are used to indicate like parts in the various views;

Figure 2 shows an embodiment of the revivifying apparatus used in connection with that portion of the apparatus shown in Figure 1.

In general, our invention contemplates the provision of apparatus in which oil vapors to be converted are brought into contact with a catalyst in a conversion zone in which the catalyst is continuously being replaced so that the composition of the oil vapor leaving the catalyst chamber will be substantially constant and may flow directly to equipment without precautions being taken for change in its composition. This is a major advantage over the intermittent processes of the prior art in which the products leaving the catalyst chamber may vary in composition. In an intermittent process, for example, in which hydrocarbon oils are cracked to form gasoline-like hydrocarbons, at the beginning of a cracking period the vapors leaving the reaction chamber may contain from 40% to 50% of gasoline, while, at the end of the period, they may contain as low as 15% to 20% of gasoline.

In the intermittent processes, in order to obtain high cracking per pass, the cracking period must necessarily be short due to the fact that the catalyst activity falls off rapidly. In a continuous process, the cracking per pass may be raised by increasing the circulation rate of the catalyst per unit of time.

In the intermittent processes, the oil vapors to be converted pass through the reaction chamber in contact with highly active catalyst only at or near the beginning of a cracking period. During the latter part of the period, the catalyst is progressively decreasing in activity. By the use of our apparatus continuous circulation of the catalyst in contact with the oil vapors is attained, the average composition of the catalyst remains substantially constant and the oil vapor always contacts catalyst of highest activity at some point in the chamber.

Our apparatus further provides means whereby the catalyst is continuously removed from the reaction chamber and is continuously revivified and recirculated to the catalyst chamber.

Heat may be supplied to the reaction chamber to compensate for the loss of heat during the endothermic reaction of cracking. If the apparatus is to be used for polymerization, heat may be removed from the catalyst by a heat exchanging medium to remove the exothermic heat of polymerization.

We will describe our apparatus in connection with the cracking of hydrocarbon oils. It is to be understood, however, that our apparatus may be used for the conversion of light hydrocarbons into heavier hydrocarbons, as well as the conversion of heavy hydrocarbons into lighter hydrocarbons.

Figures 1, 4:
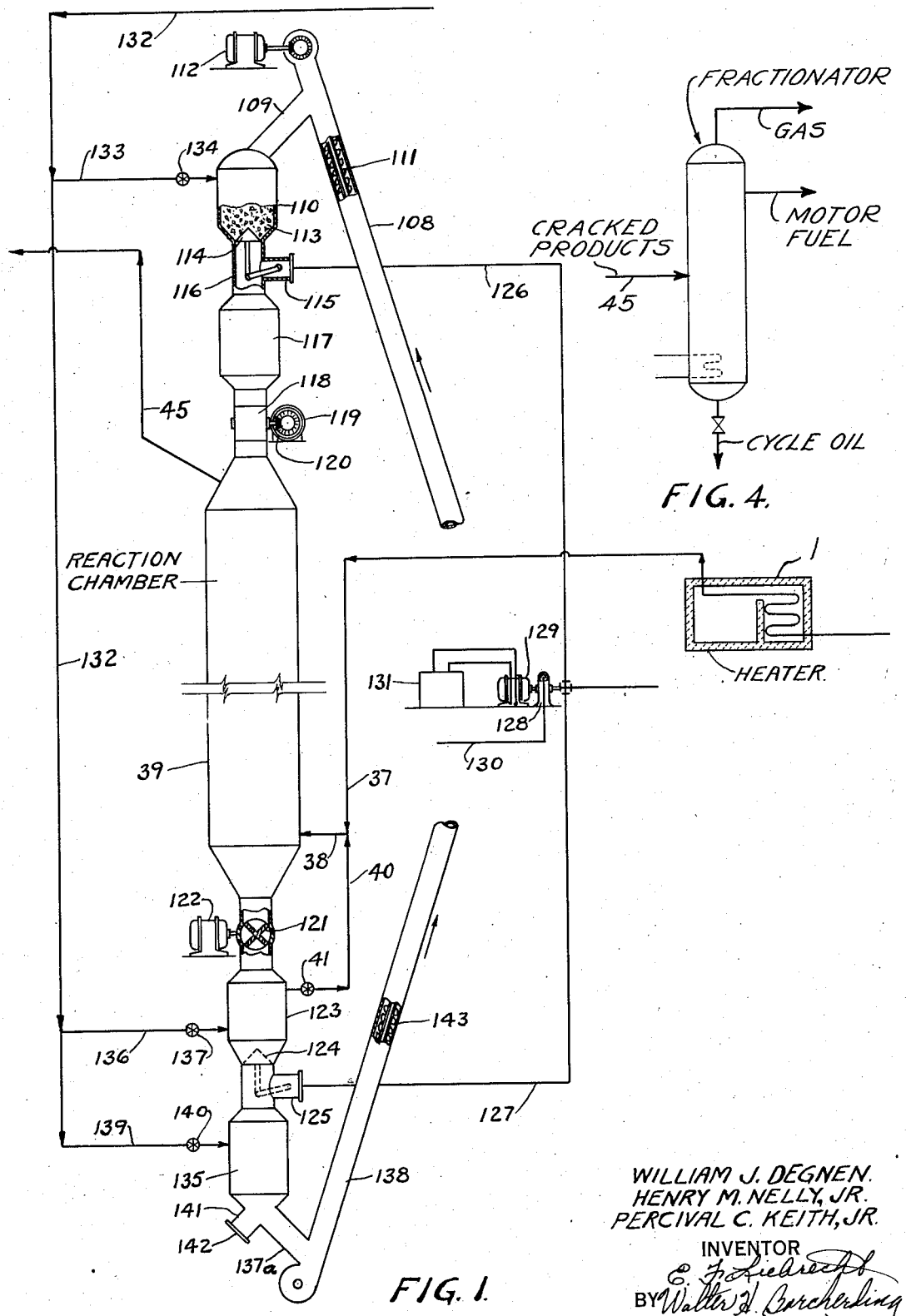
Figure 1 is a diagrammatic view of a portion of the apparatus embodying our invention.
Figure 4 illustrates diagrammatically a fractionating system for the recovery and separation of the cracked vaporous products.

The hydrocarbons undergoing conversion, for example gas oil, are vaporized and heated to a suitable conversion temperature in heater 1 and then introduced into the base of the catalyst chamber 39 through line 37 and branch line 38. For catalytic cracking this temperature may be in the range of about 750° to 1000° F. and preferably in an intermediate range of about 800° to 900° F. The hot vapors pass upward through the catalyst mass and are discharged from the chamber through line 45 to a suitable fractionating or separating system such as that illustrated diagrammatically in Figure 4, wherein the cracked vapors are separated into the desired fractions, such as normally gaseous hydrocarbons, motor fuel and recycle stock.

In the reaction chamber the heated vapors react to form lighter hydrocarbons in the presence of a catalyst. The catalyst in our apparatus is of a granular nature such that it can be fed to and withdrawn from the reaction chamber 39 continuously. The fresh catalyst which may be used or catalyst material which has been revivified, is fed through conveyor 108 for passage through duct 109 into the catalyst feeding hopper 110. The conveyor 108 is provided with any suitable conveying means 111, driven by any suitable means such as an electric motor 112. The feeding of the catalyst material 113 from the feeding hopper 110 is controlled by a cone type valve 114, provided with hydraulic operating means 115. The catalyst material passes from the feeding hopper 110 through a duct 116 into a sealing hopper 117, whence it is fed into the reaction chamber by a rotary bucket type valve or "Star-Feeder" 118, operated by an electric motor 119, through suitable gears 120. The used catalytic material is withdrawn from the reaction chamber 39 by a rotary buckettype valve or "Star-Feeder" 121 operated by an electric motor 122. The motors 120 and 122 may be synchronized so that the rate of feeding and the rate of withdrawal are kept the same. The used catalytic material passes into a sealing hopper 123, the discharge of which is controlled by a cone type valve 124, operated by a hydraulic operating mechanism 125. The hydraulic operating mechanisms 115 and 125 are adapted to be supplied with hydraulic fluid through pipes 126 and 127. A fluid pump 128 operated by an electric motor 129 supplies the fluid from pipe 130 for functioning the hydraulic operating mechanisms 115 and 125. A timing control mechanism 131 of any suitable type known to the art controls the electric motor 129 and may also be connected to valves provided in lines 126 and 127 so that the cone type valves 114 and 124 are intermittently operated to introduce fresh catalytic material into sealing hopper 117 and to withdraw used catalytic material from sealing hopper 123. An inert gas, such as flue gas, steam, or a dry hydrocarbon gas from the fractionating system (not shown), if desired, under suitable pressure and at a suitable temperature, is introduced into manifold 132. A pipe 133, controlled by a valve 134, permits gas from manifold 132 to flow into upper sealing hopper 110. The pressure of the gas is such that it is slightly in excess of that existing in the catalyst chamber. The imposition of this pressure in upper sealing hopper 110 and in feeding hopper 117 will effectively prevent leakage outward of the cracked vapors. Any leakage which might occur will be into the reaction chamber 39. The capacity of the lower sealing hopper 135 is sufficiently greater than the discharge hopper 123 so that there will always be a quantity of material present in lower sealing hopper 135. Thus continuity of feed to the revivifier is assured. The pressure in upper sealing hopper 110 may be readily controlled by valve 134 which may be automatically controlled by differential pressure controller between the upper sealing hopper 110 and the reaction chamber, if desired.

Sealing gas from manifold 132 is also introduced through pipe 136 controlled by valve 137 into the discharge hopper 123. By control of valve 137, the pressure within discharge hopper 123 is controlled to be slightly in excess of that which exists in pipe 37 and in the reaction chamber 39 so that the gas introduced into the discharge hopper 123 will denude and strip the catalytic material discharged of vapors which are carried either absorbed in the catalytic material or physically mixed in the mass. The stripped vapors and sealing gas will leave the discharge hopper 123 through pipe 40 which is controlled by valve 41 and pass through pipe 38 into the reaction chamber along with the hot vapors to be reacted in the reaction chamber.

The stripped, used catalyst passes into the lower sealing hopper 135, whence it passes through duct 137a and is fed by conveyor 138 to the revivifying operation. Sealing gas from manifold 132 passes through the pipe 139 controlled by valve 140 into the lower sealing hopper 135 adapted to seal the lower end of the reaction chamber. If it is desired to locate the revivifier adjacent the reaction chamber, the used catalytic material may be withdrawn through duct 141 normally sealed by a cover plate 142.

Any desired rate of catalyst flow may be obtained by controlling the speed of motors 120 and 122. The timing arrangement 131 is so controlled that cone type valves 114 and 124 are operated with sufficient frequency to keep a supply of material in feeding hopper 117 and to keep the discharge hopper 123 sufficiently free of material to receive the used catalytic material flowing from the reaction chamber past valve 121. It will be obvious, of course, that the conveyors will be operated at a synchronous speed to keep the upper sealing hopper 110 supplied with material and maintain the material in the lower sealing hopper 135 at a safe operating level.

Referring now to Fig. 2, we show one embodiment of a revivifying apparatus capable of continuously revivifying the used catalytic material. Conveyor 138 provided with suitable conveying means 143 feeds the used catalytic material into a hopper 144, from which it is withdrawn through duct 145 and passed through a conveyor tube 146 by a feeding screw 147 operated by an electric motor 148. The conveyor tube 146 and the feeding screw 147 are tapered to cause the catalytic material to pack densely, enabling it, per se, to act as a seal.

The pressure of the sealing gas in the discharge hopper 135 exists throughout the conveyor tube 138 and in feeding hopper 144, so that any leakage will be merely of material inwardly toward the revivifier. The revivifier is of the rotary kiln type in which the catalytic material is contacted with a gas which will effectively remove all or some of the carbon absorbed in the process and regenerate the catalyst to active condition. Producer gas reactions enabling a removal of carbon by reduction of carbon dioxide and steam may be employed, though we prefer to use simple oxidation with air.

In starting the operation of the revivifier, air from the air manifold 149 passes through pipe 150 through valve 151, to a burner 152, to which fuel gas is supplied through the pipe 153. The kiln shell 154 is provided with a ring gear 155 meshing with the pinion 156 which is driven by an electric motor 157, enabling the kiln to rotate upon its saddles 158 and 159, on suitable rollers 160. End sections 161 and 162 are stationary.

After the revivifier reaches a sufficient temperature, the burner 152 is shut off and valve 151 is closed. Valve 163 is opened and air under pressure is passed into the revivifier in contact with the used catalytic material. The resulting oxidation will burn the carbon and adsorbed compounds from the catalyst material, revivifying it. The resulting products of combustion are withdrawn from the revivifier through duct 164 and pass through a centrifugal separator 165 for removal of entrained catalytic material dust, which is collected in the separator bottom 166 and removed therefrom by conveyor screw 167 operated by an electric motor 168.

The clean flue gases leave the separator 165 through duct 169 and may pass through duct 170 to the stack 171 by opening dampers 172 and 173. The heat is the gases resulting from revivification of the catalyst may be recovered in part by passing them through a flue gas steam generator 175, after which they may pass through duct 176, past damper 173 to the stack 171. A portion of the cooled flue gases may be withdrawn through duct 178 by blower 179 and passed through duct 180 for recirculation to the revivifier to control the temperature of the revivification.

A compressor 181 supplies air to the pipe 149 for passage to the revivifier. A portion of the gases of revivification may be withdrawn through pipe 182 and passed through cooler 183 for compression by compressor 184 and passage through pipe 185 to a sealing gas receiver 186. The cooler may be by-passed by by-pass pipe 187 controlled by valve 188. The compressed flue gases in the flue gas receiver acts as a source of sealing gas for the sealing gas system heretofore described. The sealing gas is withdrawn from the flue gas receiver 186 through pipe 189 and may be passed, if desired, through a reheater 190 for heat exchange with a hot medium such as superheated steam or a portion of hot flue gas from duct 164, supplied to heat exchanger through pipe 191. The sealing gas may by-pass the reheater 190 through pipe 192, controlled by valve 193. The sealing gas passes from the reheater 190 or from by-pass line 192 into the sealing gas manifold 132. The rotary revivifier is mounted at a slight angle, the stationary section 162 being lower than the stationary section 161, so that the revivified catalytic material passes from the revivifier through duct 194 into a discharge hopper 195. Fresh catalytic material may be added at this point from hopper 196 through duct 197 controlled by valves 198 and 198'. It will be noted that the revivifier may operate under pressure and valves 198 and 198' serve as locks in introducing fresh catalyst.

The catalytic material which is too fine for recycling is separated by maintaining the velocity of the regeneration gas circulated through the regenerator at such a value that the fines are suspended therein and subsequently separated in the separator 165. The revivified catalytic material from hopper 195 is fed by screw conveyor 199, which is operated by electric motor 200, into conveyor feeding chamber 201, from which the catalytic material passes through duct 202 to the fresh catalytic material conveyor tube 108 for carriage by conveyor means 111 to the reaction chamber catalyst feeding hopper 110.

Figure 3:
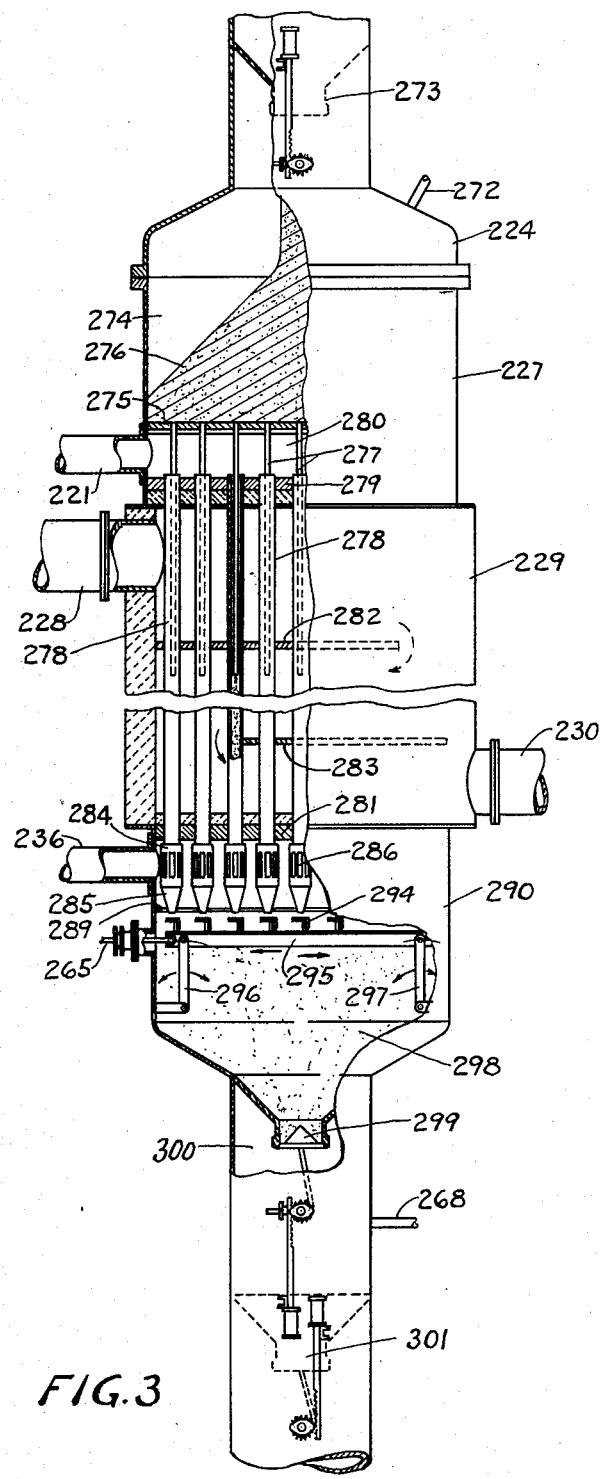
Figure 3 is a sectional view of a catalyst contact chamber forming a portion of the apparatus of our invention.

Referring now to Figure 3, we have shown a catalytic reaction chamber provided with means for continuously heating the reaction zone in order to compensate for the endothermic reaction of cracking. Catalyst is admitted by a valve 273, the catalyst passing into an upper compartment 274 formed within the reaction chamber 224 by a tube sheet 275 which acts as a distributing plate to distribute the catalyst 276 to the feeder tubes 277. The arrangement is such that accumulations of stagnant catalyst adjacent the upper openings of the catalyst tubes 278 is avoided. The feeder tubes 277 extend some distance downwardly into the reaction tubes 278. Below the feeder tube sheet 275 we position a tube sheet 279 in which the catalyst tubes 278 are welded or rolled. The space 280 between the tube sheet 275 and the tube sheet 279 serves as an inlet vapor space to which the incoming hot vapors to be cracked are introduced through pipe 221. The feeder tubes 277 feed the catalyst to the catalyst tubes 278. The length of the feeder tubes will determine the height of the catalyst material maintained within the catalyst tubes. By varying the length of the feeder tubes, the amount of catalyst in the catalyst tubes is determined. This enables us to change the amount of catalyst for cracking various types of stock and employing different types of catalytic material.

The lower portions of the catalyst tubes are welded or rolled in a lower tube sheet 281. A plurality of baffles 282 and 283 are disposed around the exterior of catalyst tubes 278 transversely of the heating jacket 229 to direct the flow of the heating medium which is introduced to the heating jacket through duct 228 and withdrawn therefrom through duct 230. Heat exchange between the heating medium and the reactants within the catalyst tubes supplies heat to the endothermic cracking reaction.

In order to remove the catalyst and the vapors separately from the lower ends of the catalyst tubes, we provide means to effect the separation of the catalyst and the vapors. It will be noted that the catalyst tubes 278 extend beyond the lower tube sheet 281. To these extensions are fitted elements comprising upper cylindrical portions 284 and lower conical portions 285. The cylindrical portions 284 are provided with slots 286, normally covered by screens. The screens are made with a mesh sufficiently small to permit the discharge of the vapors while preventing the catalyst from passing therethrough.

A plurality of angles 294 are supported by a cross member 295 and are positioned beneath and adjacent discharge openings of cones 285. The cross member 295 is pivotally supported on links 296 and 297. The reciprocating rod 265, driven as indicated hereinabove, passes through a stuffing box and is adapted to actuate the gridwork formed by cross members 295 and angles 294. The reciprocation of the grid alternately moves the angles clear of the respective discharge openings and to a position blocking the same. When the grid is clear of the openings, catalyst material will flow from the discharge cones 285 to the space 298 beneath the discharge arrangement. From the space 298 the catalyst material passes by valve 299 into the sealing hopper 300 from which it is discharged past valve 301. The sealing gas for the lower hopper is introduced through pipe 268.

The slots 286 in the base of the discharge cones are made considerably larger in total area than the internal cross sectional area of the tubes. As shown, the area of the slots is substantially four times as large as the internal cross sectional area of the tubes. This enables ready separation of the cracked vapors from the spent catalyst material to be effected. The discharge valves 299 and 301 and the catalyst feeding valve 273 are operated either by electrical or fluid pressure control mechanism in accordance with a time cycle regulated to introduce the catalyst at definite intervals in amounts proportioned according to the rate of catalyst flow from the tubes. A level gauge (not shown) may be employed in an upper feed compartment. A level gauge may be employed to indicate the amount of catalyst material in a lower discharge compartment. The change in levels of the upper and lower hoppers will serve to indicate the rate of catalyst flow through the catalyst chamber.

By way of illustration and not by way of limitation, a Mid-Continent virgin gas oil was supplied as charging stock for the process. The catalytic material was alumina deposited upon silica gel. The reaction temperature maintained within the catalyst bed varied from 840° F. at the bottom to 890° F. at the top. The time in which the catalyst was retained in passing through the chamber was about 8.25 hours. The space velocity during the operation was 4.28 barrels per hour of charge per ton of catalyst material in the bed. Under these conditions the following yields were obtained:

|  | Percent |
|---|---|
| Gasoline (100% C₄ recovery) _____vol__ | 46 |
| Cycle stock_____vol__ | 48 |
| Gas _____wt__ | 9 |
| Coke _____wt__ | 2.4 |

The catalyst was continuously revivified. The gasoline yield from this run is approximately 12% greater than that predicted for a run under similar conditions made in a stationary catalyst bed.

The operation of our apparatus will be understood from the foregoing description. It will be seen that we have accomplished the objects of our invention. We have provided an apparatus for catalytic cracking whereby the composition of the oil vapor leaving the catalyst chamber may be maintained substantially constant. This enables it to flow directly to the fractionating and stabilization equipment without special precaution being taken for periodic changes in its composition. This is not true in the intermittent process in which the gasoline content of the vapors leaving the reaction chamber may vary from 40% to 50% at the start of the cracking period, and be as low as 15% to 20% at the end of the cracking period.

In order to obtain a very high cracking per pass in the intermittent process the cracking periods must necessarily be short due to the rapid falling off of catalyst activity. Through our means for continuous catalytic material replacement, the cracking per pass may be raised by circulating more catalyst per unit of time. In the intermittent process the vapors contact highly active catalytic material only a short period of time. In our apparatus highly active catalytic material is constantly being supplied so that there is always present in the reaction zone a considerable bed of highly active catalytic material.

Besides catalytic cracking, the apparatus is also suited to other endothermic catalytic reactions such as dehydrogenation of hydrocarbon oils and gases. To adapt the apparatus to exothermic reactions such as catalytic polymerization or synthesis reactions, provision would be made for removing excess heat produced during the reactions.

We have provided means for supplying the heat of reaction continuously during the cracking reaction, to enable us to obtain a high percentage action of cracking per pass. It is to be understood, of course, that if desired, a non-heated type of reaction chamber may be employed, and the heat supplied by high preheat of the cracked vapors.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

We claim:

1. Apparatus for continuous catalytic cracking of hydrocarbon oils comprising a pipe still for heating said oils to a cracking temperature, a cracking chamber provided with a granular catalyst inlet and a granular catalyst outlet and also provided with a charging stock inlet and a cracked product outlet, said inlets and said outlets being positioned at opposite ends of said chamber, a transfer line connecting said charging stock inlet with said pipe still, a fractionating system, means for introducing products from the cracked product outlet to said fractionating system, a revivification chamber provided with a granular catalyst inlet and a granular catalyst outlet and also with a revivification medium inlet and a revivification medium outlet, said last-mentioned inlets and said last-mentioned outlets being positioned at opposite ends of said revivification chamber, means for transferring hot spent granular catalyst from said cracking chamber outlet to said revivification chamber inlet while the cracking and revivification operations are in progress, said means comprising a valve adapted to transfer granular catalyst, means for maintaining a zone of inert gas at a pressure higher than the pressure in the cracking chamber adjacent the down-stream side of said last-mentioned valve to prevent the escape of reactant gas from said cracking chamber and means for transferring hot revivified granular catalyst from said revivification chamber outlet to said cracking chamber inlet while the cracking and revivification operations are in progress, said last-mentioned means comprising at least one valve adapted to transfer granular catalyst and means for maintaining a zone of inert gas at a pressure higher than the pressure in the cracking chamber on the up-stream side of said last mentioned valve to prevent the escape of reactant gas from said cracking chamber.

2. A system for the catalytic conversion of petroleum hydrocarbons which comprises a substantially vertical conversion chamber, means including a valve above said chamber for admitting catalyst thereto, means for maintaining a zone of inert gas at a pressure higher than the pressure in the cracking chamber on the up-stream side of said last mentioned valve to prevent the escape of reactant gas from said cracking chamber, means including a valve below said chamber for maintaining said chamber substantially full of catalyst material and for discharging catalyst therefrom at substantially the rate at which it is introduced thereto, means for continuously heating hydrocarbon vapors to a cracking temperature and for passing said heated vapors through said chamber, a fractionating system, means for introducing products from said conversion chamber to said fractionating system, a catalyst regeneration chamber, means including the second-named valve below said conversion chamber for admitting spent catalyst from said conversion chamber to said regeneration chamber, means for maintaining a zone of inert gas at a pressure higher than the pressure in the conversion chamber adjacent the down-stream side of said last mentioned valve to prevent the escape of the reactant gas from said conversion chamber, means for feeding granular catalyst disposed below the regeneration chamber for discharging regenerated catalyst therefrom at substantially the rate at which it is introduced thereto and means for returning regenerated catalyst discharged through said feeder means for introduction through said first-named valve.

3. Apparatus for continuous catalytic cracking of hydrocarbon oils comprising a pipe still for heating said oils to a cracking temperature, a cracking chamber provided with a catalyst inlet and a catalyst outlet and also provided with a charging stock inlet and a cracked product outlet, a transfer line connecting said charging stock inlet with said pipe still, a fractionating system, means for introducing products from the cracked product outlet to said fractionating system, a revivification chamber provided with a catalyst inlet and a catalyst outlet and also with a revivification medium inlet and a revivification medium outlet, means for transferring hot spent catalyst from said cracking chamber outlet to said revivification chamber inlet while the cracking and revivification operations are in progress, said means comprising a valve adapted to transfer catalyst, means for maintaining a zone of inert gas at a pressure higher than the pressure in the cracking chamber adjacent the down-stream side of said last mentioned valve to prevent the escape of reactant gas from said cracking chamber, means for transferring hot revivified catalyst from said revivification chamber outlet to said cracking chamber inlet while the cracking and revivification operations are in progress, said last-mentioned means comprising at least one valve adapted to transfer catalyst, and means for maintaining a zone of inert gas at a pressure higher than the pressure in the cracking chamber on the up-stream side of said last mentioned valve to prevent the escape of reactant gas from said cracking chamber.

WILLIAM J. DEGNEN.
HENRY M. NELLY, JR.
PERCIVAL C. KEITH, JR.